(12) United States Patent
Horstmann

(10) Patent No.: US 12,316,251 B2
(45) Date of Patent: *May 27, 2025

(54) VARIABLE-SPEED DRIVE FOR SINGLE-PHASE ASYNCHRONOUS MOTORS

(71) Applicant: HORSTMANN SYSTEMS CORPORATION, Pasadena, CA (US)

(72) Inventor: Manfred Horstmann, Pasadena, CA (US)

(73) Assignee: HORSTMANN SYSTEMS CORPORATION, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/587,509

(22) Filed: Feb. 26, 2024

(65) Prior Publication Data

US 2024/0195336 A1 Jun. 13, 2024

Related U.S. Application Data

(63) Continuation of application No. 17/863,431, filed on Jul. 13, 2022, now Pat. No. 11,916,497, which is a continuation-in-part of application No. 17/529,233, filed on Nov. 17, 2021, now abandoned.

(51) Int. Cl.
*H02P 23/00* (2016.01)

(52) U.S. Cl.
CPC .................................. *H02P 23/00* (2013.01)

(58) Field of Classification Search
CPC .. H02P 23/08; H02P 25/04; H02P 6/26; H02P 1/426; H02P 1/42
See application file for complete search history.

(56) References Cited

U.S. PATENT DOCUMENTS

2003/0043606 A1* 3/2003 Lipo ..................... H02P 1/44
363/41

FOREIGN PATENT DOCUMENTS

EP             501634 A2 *  9/1992   ............... H02P 1/44

* cited by examiner

*Primary Examiner* — Bickey Dhakal
(74) *Attorney, Agent, or Firm* — LOZA & LOZA LLP; Derek Yeung

(57) ABSTRACT

A frequency converter circuit is disclosed for controlling the speed of a single-phase asynchronous motor wherein the controlled speed keeps the slip between the speed of a driving magnetic field and a speed of a motor rotor as small as possible. Voltage and frequency are provided by the frequency converter circuit wherein a current is provided using the characteristics of the motor and its load mechanically connected to the shaft. By utilizing this current the lowest possible slip results in the maximum possible efficiency at the required operating point of the motor.

5 Claims, 6 Drawing Sheets

VARIABLE-SPEED DRIVE FOR SINGLE-PHASE ASYNCHRONOUS MOTORS

PRIORITY CLAIM

This application is a continuation application of nonprovisional patent application Ser. No. 17/863,431 filed in the United States patent office on Jul. 13, 2022, which is a continuation in part of patent application Ser. No. 17/529,233 having a filing date of Nov. 17, 2021. The entire content of both prior applications is incorporated herein by reference.

FIELD OF THE INVENTION

This invention provides an improved variable-speed drive for single-phase AC motors for keeping the slip between the speed of a driving magnetic field and a speed of a motor rotor as small as possible.

BACKGROUND OF THE INVENTION

Prior art circuits for driving single-phase motors at variable-speeds typically use a RMS value of an electric current supplied to an induction motor by interposing a device or circuit to keep the current more or less constant, independent of the frequency of the upstream voltage source, the current through the motor having the same frequency as the voltage of the upstream voltage source.

This device or circuit of the prior art was implemented either digitally by a timing pulse generator or accomplished by interposing a run capacitor having capacitive reactances. Depending on the demand, more or less reactances are switched on or off to achieve the required current. Since the torque of a motor depends on the current flowing through it, the torque also remains constant with constant current.

While this approach can give some variation in motor speed, it had several problems. One problem is that the impedance of the run capacitor increases as the frequency is reduced. This high impedance reduces current in the start winding, which means that the torque of the motor is not sufficient to start the motor at low frequency. In addition, this prior art approach uses a filter to remove the high-frequency components from the power supply, which adds to the cost and complexity of this approach.

A second prior art technique used a two-phase inverter. This prior art approach removes the run capacitor from the circuit and supplies the start winding with a voltage that is 90 degrees out of phase with a voltage for the main winding. Since the run capacitor is normally sized so that the voltage across the start winding is higher than that for the main winding, the inverter must also supply a higher voltage to the start winding.

There are two problems with this technique. The first problem is that the inverter must create a voltage that is higher than the utility line voltage in order to supply the start winding, which adds cost and complexity to the electronics. The second problem is that the required voltage for the start winding varies from motor to motor so that field retrofit of a motor is difficult. Whereby the power of the auxiliary winding can be 80% and more of the main winding.

The circuit device of the present invention solves these prior art problems discussed above in a unique and novel fashion by providing a frequency converter circuit containing a power supply that converts a supplied AC voltage into a DC voltage.

SUMMARY OF THE INVENTION

The current invention uses a new approach to solve the problems over the prior art. Unlike the prior art it supplies a frequency converter circuit for controlling the speed of the single-phase asynchronous motor wherein the controlled speed keeps the slip between the speed of a driving magnetic field and a speed of a motor rotor as small as possible. The frequency converter circuit provides the voltage and frequency wherein the current is provided using both the characteristics of the motor and its load mechanically connected to the shaft. The voltage values for the main winding and the auxiliary winding can always assume the values for which the windings are designed, independently of each other. By utilizing these voltages, the lowest possible slip results in the maximum possible efficiency at the required operating point of the motor. This approach reduces the cost while improving the performance of the present invention compared to the prior art.

BRIEF DESCRIPTION OF THE DRAWINGS

In the accompanying drawings, the preferred embodiment of the invention and preferred methods of practicing the invention are illustrated in which.

DESCRIPTION OF THE INVENTION

Figure 1:
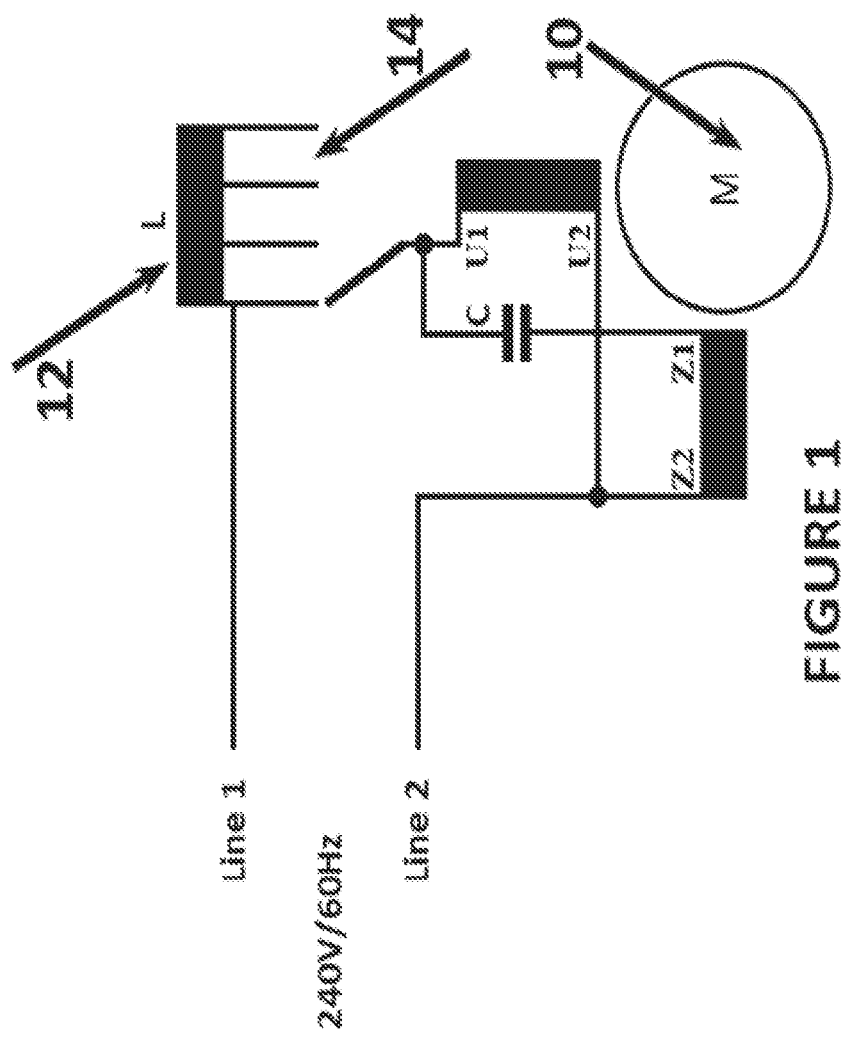
FIG. 1 is an electrical schematic of a prior art variable speed drive for a single-phase motor.
Figure 2:
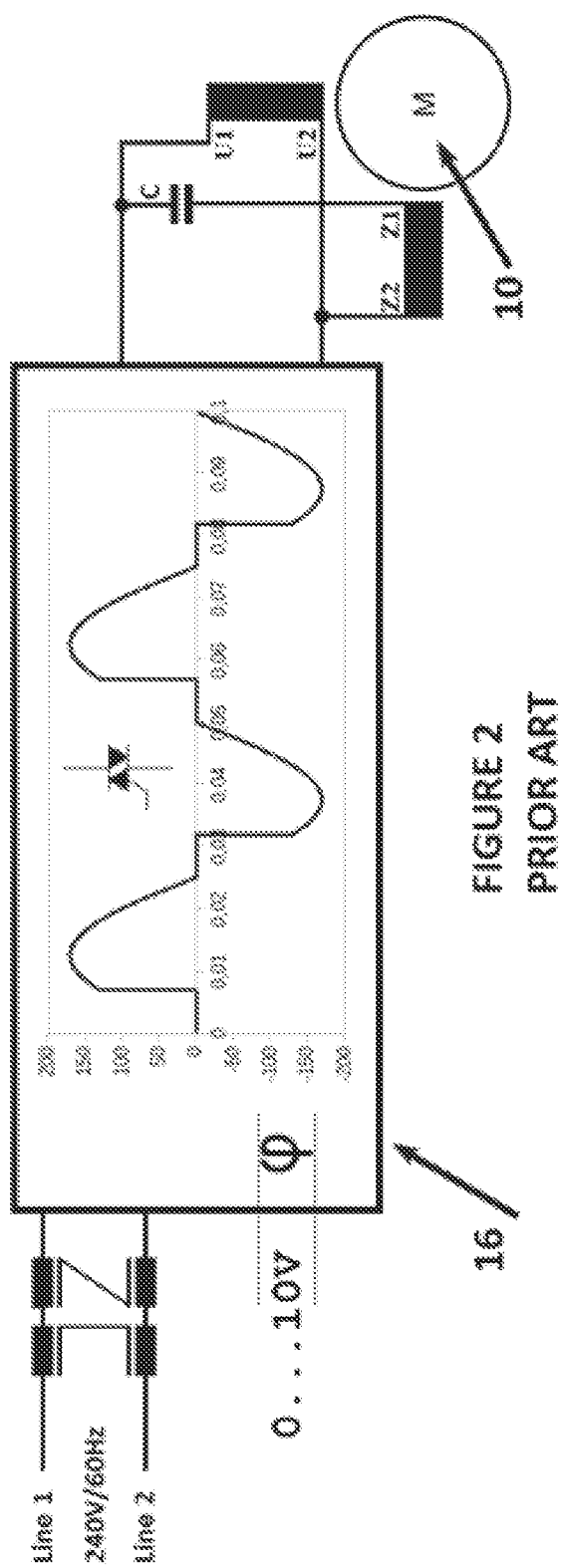
FIG. 2 shows an alternate embodiment of the drive shown in FIG. 1 wherein phase control is used to vary the motor speed.
Figure 3:
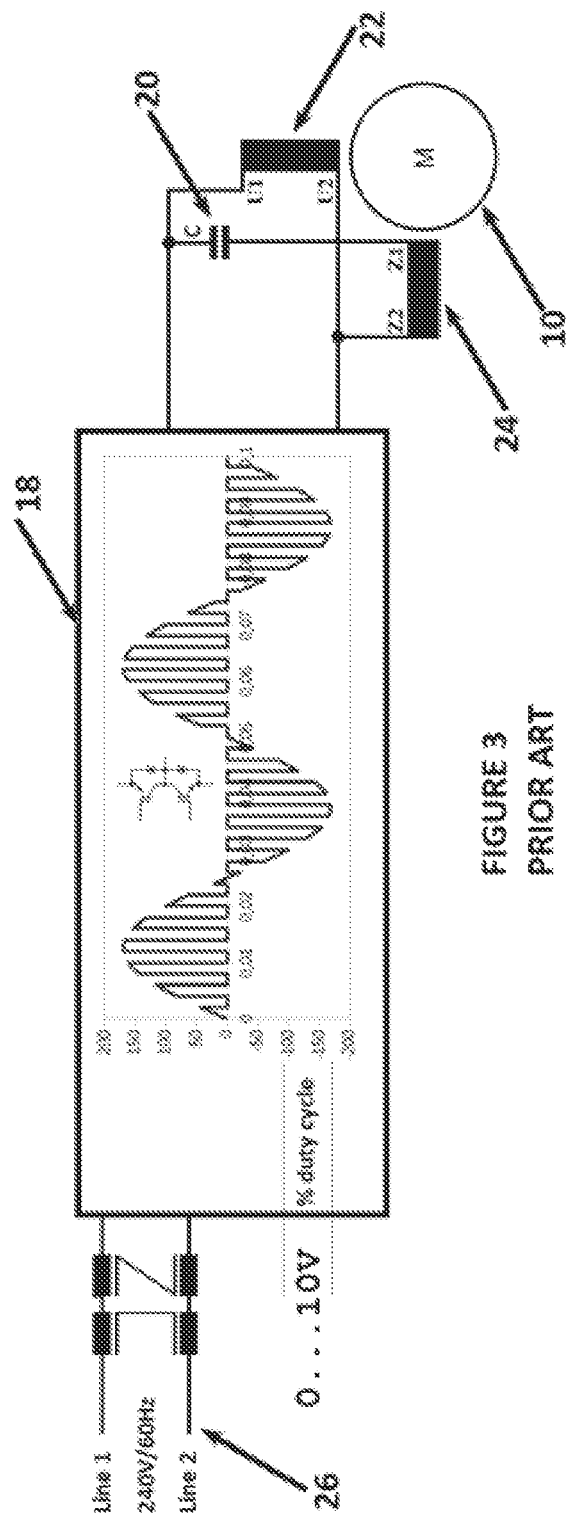
FIG. 3 shows another alternate embodiment of the drive shown in FIG. 1 wherein a chopper is used to vary the motor speed.

FIGS. 1 through 3 are circuit diagrams illustrating the prior art used to vary the speed for single-phase motors. Referring now to FIG. 1, a motor 10 is preceded by an L inductor 12 with several taps 14: Due to the number of taps 14, the speed can be switched in several stages. Turning now to FIG. 2, a phase cut control 16 is used wherein due to the phase cutting angle, the speed may be constantly changed. Referring now to FIG. 3, a chopper 18 may be used wherein due to the duty cycle, the speed may be constantly changed.

The disadvantage of the prior art circuits illustrated above for speed control shown in advance is that the change in speed creates a difference in speeds between a rotating magnetic field and a rotating squirrel cage (not shown). The speed of the magnetic field $\omega_1$ is constant. The speed of the rotor $\omega_2$ changes. The speed $\omega_2$ is always less than the speed $\omega_1$ unless rotational energy is supplied externally to the motor via its shaft.

For the performance P of a rotating system, there is the following relationship:

$$P_{rotation} = M*\omega \text{ with } \omega = 2*\pi*RPM/60 \text{ s}$$

The torque M of the rotating magnetic field is absorbed by the holder of the motor. The torque M of the shaft is transmitted on its shaft to the coupled element (fan, gear, etc.). Both torques are equal. Thus, for the power that the rotating magnetic field provides:

$$P_{input}=M*\omega_1$$

wherein for the output power on the shaft:

$$P_{output}=M*\omega_2$$

The following applies to the efficiency n of a system:

$$\eta=P_{output}/P_{input}$$

$$\eta=M*\omega_2/M*\omega_1, \text{ wherein:}$$

$$\eta=\omega_2/\omega_1$$

The above derived equation illustrates that the efficiency of the motor can never be greater than the ratio of shaft speed to the speed of the magnetic field. If the rotor of a motor rotates half as fast as its magnetic field, at least 50% of the energy supplied is therefore converted into heat. In addition, it should be appreciated that there are electrical, remagnetization and friction losses.

This explains why the speed of such controlled motors cannot be regulated down to the extent that it is possible with three-phase asynchronous motors with upstream frequency converters. Additionally, this also explains why single-phase motors get so warm when they are limited to e.g. 70% of their rated speed.

Figure 4:
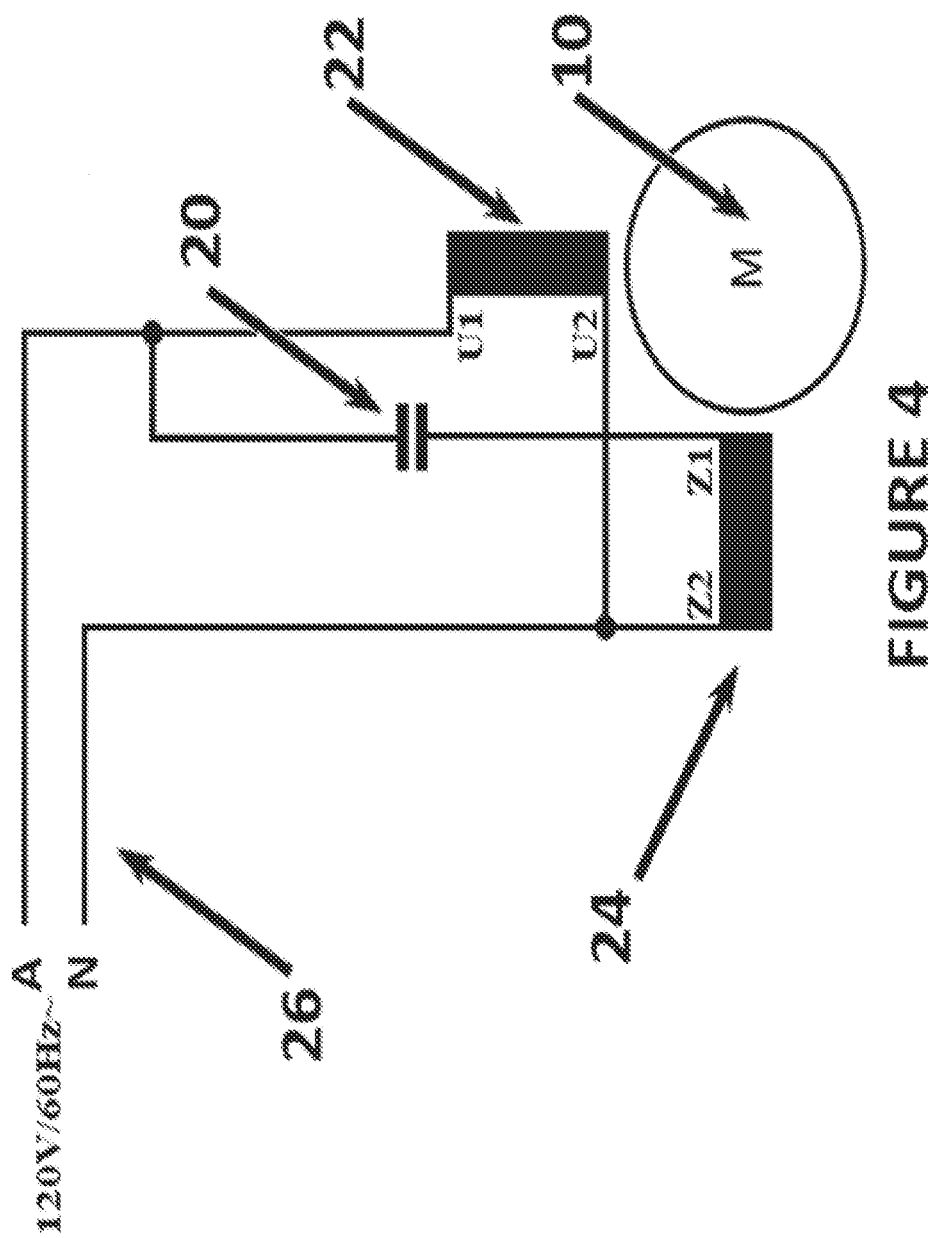
FIG. 4 shows an electrical schematic utilizing a capacitor.
Figure 5:
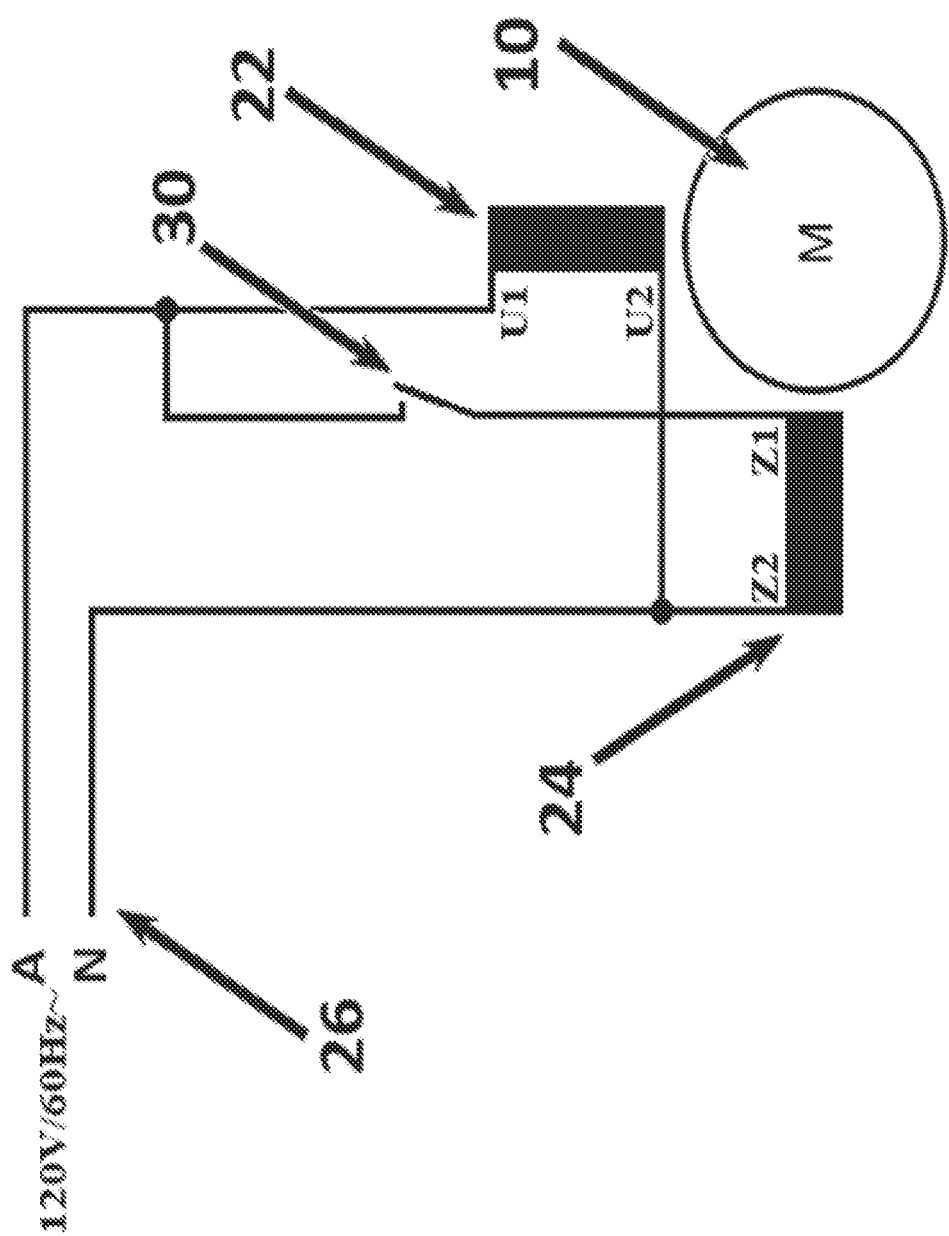
FIG. 5 shows an electrical schematic utilizing a switch.
Figure 6:
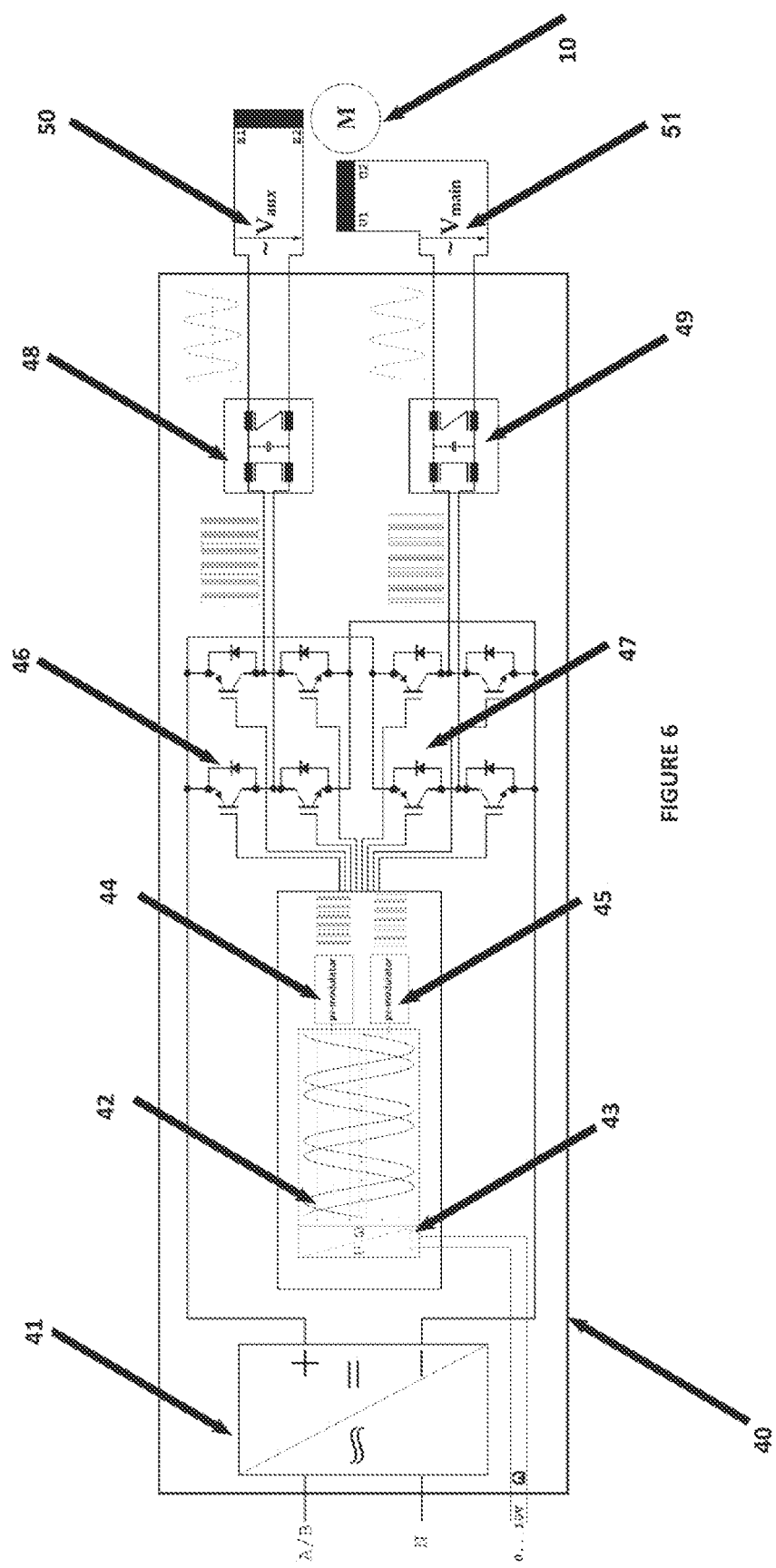
FIG. 6 shows an electrical schematic of a voltage/frequency converter in accordance with the present invention used to vary the motor speed.

Referring now to FIGS. 4 through 6, a mode of action in accordance with the present invention illustrate a frequency converter technique for single-phase AC motors utilizing a capacitor 20 or auxiliary winding for driving a motor at start-up at varying speeds, Single-phase AC motors 10 have a working winding 22 and an auxiliary winding 24. During operation, the working winding 22 is connected directly to the AC voltage 26 of the grid.

As shown in FIGS. 5 and 6 the auxiliary winding 24 is permanently connected to the mains via a capacitor 20 or a switch 30 during start-up. Due to the capacitor 20, the current is shifted in time by the auxiliary winding 24 against the current of the working winding 22, creating a rotating magnetic field in the motor 10.

With such motors 10, the working and auxiliary windings 22 and 24 respectively, may have the same properties. In most cases, however, the auxiliary winding 22 has more turns and a higher resistance to be able to use capacitors 20 with lower capacitances.

In the case of motors 10 with an auxiliary winding 24 and switch 30, the properties of working 22 and auxiliary winding 24 differ. The difference leads to a temporal shift of the currents through the two windings. However, the offset is much lower than with the capacitor 20, which results in a much lower starting torque.

The largest moment results when the currents are shifted by 90°. However, due to the passive properties of the windings and the capacitor, this ratio is only possible at a certain frequency, not ever for a frequency range. The rotational frequency of the magnetic field is determined by the feeding network.

To improve the efficiency of a device, it can be beneficial to make the fixed speed of an electric motor variable. If a single-phase AC motor is installed, it can be replaced with a new servo or EC motor. This requires new cabling and often also mechanical adjustments with considerable effort and corresponding costs. Therefore, the motor 10 may be preceded by an electrical device with which the speed can be controlled.

With the devices currently on the market, however, this is only possible to a small extent. At speeds below 70%, the motors overheat if they are to apply partial power to the shaft that corresponds to their rated power, i.e. if they are not to provide these speeds at idle. As the frequency of the applied voltage decreases (increasing reactance of the capacitor) and the speed decreases, the torque decreases excessively so that they can no longer be used at low speeds due to overheating.

Turning now to FIG. 6, a frequency converter 40 in accordance with the present invention contains a power supply 41 that converts the supplied AC voltage into a DC voltage. In addition, the converter contains a quadrature-oscillator 43, which generates two sinusoidal oscillations 42 respectively having a phase shift of exactly 90°. By means of a control voltage between 0 and 10V, the frequency of the quadrature-oscillator may be changed between (0 . . . 70 Hz).

The two sine oscillations 42 offset by 90° are each fed to a pulse sum modulator 44/45. These two modulators 44 and 45 generate pulsating high voltages with high frequencies (e.g., ~2 . . . 120 kHz) with constant amplitudes. The ratio of the on/off duration of these pulsating voltages is such that the RMS value of the pulsating voltage corresponds to the actual amplitudes of the supplied sine voltages.

The outputs of the modulators 44 and 45 with voltages of a few volts are supplied to IGBT-bridges or PET-Bridges (e.g., transistor bridges 46 and 47), which chop the DC voltage of 170/340V provided by the power supply with low loss in the rhythm of the pulsating voltages that are outputted by the modulators 44 and 45. Downstream filters 48 and 49 convert the supplied pulse voltages (e.g., 170/340V) into sine voltages (e.g., 120/240V) for the two windings of the single-phase motor 10 by suppressing the harmonics.

In this forming, the speed of the magnetic field in the single-phase motor 10 corresponds to the frequency of the quadrature-oscillator. Since the voltage at both windings is offset by 90°, the motor 10 can generate the maximum possible torque and the lowest possible slip at any speed. With $\eta=\omega_2/\omega_1$, it also means the greatest possible efficiency and the best utilization of the supplied energy.

Overall this system has major advantages over the prior art, including the following advantages:

1) drives standard single-phase induction motors at variable speeds,
2) does not require generation of a voltage that is higher than the line voltage,
3) generates good starting torque without excessive inrush current,
4) allows use of a bypass switch to allow motor operation from a single-phase power supply,
5) is compatible with electromechanical alternators, and
6) can use existing inverter hardware designed for driving three-phase motors.

The invention having thus been described, it will be apparent to those skilled in the art that the same may be varied in many ways without departing from the spirit and scope of the invention. Any and all such modifications are intended to be encompassed within the following claims.

What is claimed is:

1. A control circuit for controlling a single-phase AC motor, comprising:
    a quadrature oscillator configured to output a first sinusoidal signal and a second sinusoidal signal, the first sinusoidal signal and the second sinusoidal signal being out of phase;
    a first circuitry configured to:
        generate a first pulsing voltage based on the first sinusoidal signal;
        generate a second pulsing voltage using the first pulsing voltage;
        convert the second pulsing voltage to a first sine voltage; and output the first sine voltage to a main winding of the single-phase AC motor; and a second circuitry configured to:
  generate a third pulsing voltage based on the second sinusoidal signal;
  generate a fourth pulsing voltage using the third pulsing voltage;
  convert the third pulsing voltage to a second sine voltage; and
  output the second sine voltage to an auxiliary winding of the single-phase AC motor.

2. The control circuit of claim 1, wherein an amplitude of the first sine voltage and an amplitude of the second sine voltage are independently adjustable.

3. The control circuit of claim 1, wherein the first sine voltage and the second sine voltage have a phase shift of 90 degrees.

4. The control circuit of claim 1, wherein the first sine voltage and the second sine voltage have a common frequency.

5. The control circuit of claim 4, wherein the common frequency is adjustable by a control voltage of the quadrature oscillator.

* * * * *